Dec. 11, 1928.
F. W. BLACKBURNE
1,695,083
ESCALATOR SAFETY DEVICE
Filed Nov. 30, 1926    2 Sheets-Sheet 1
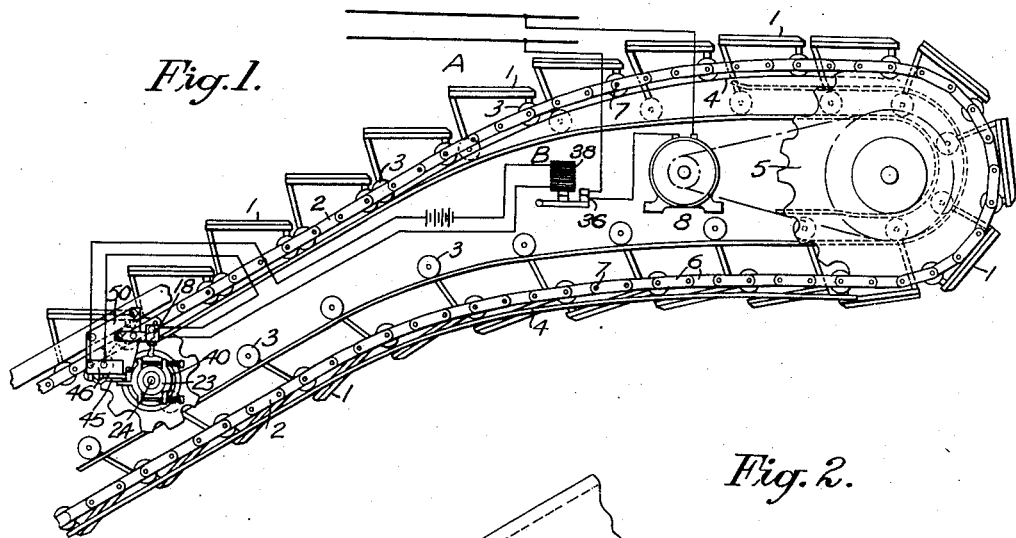
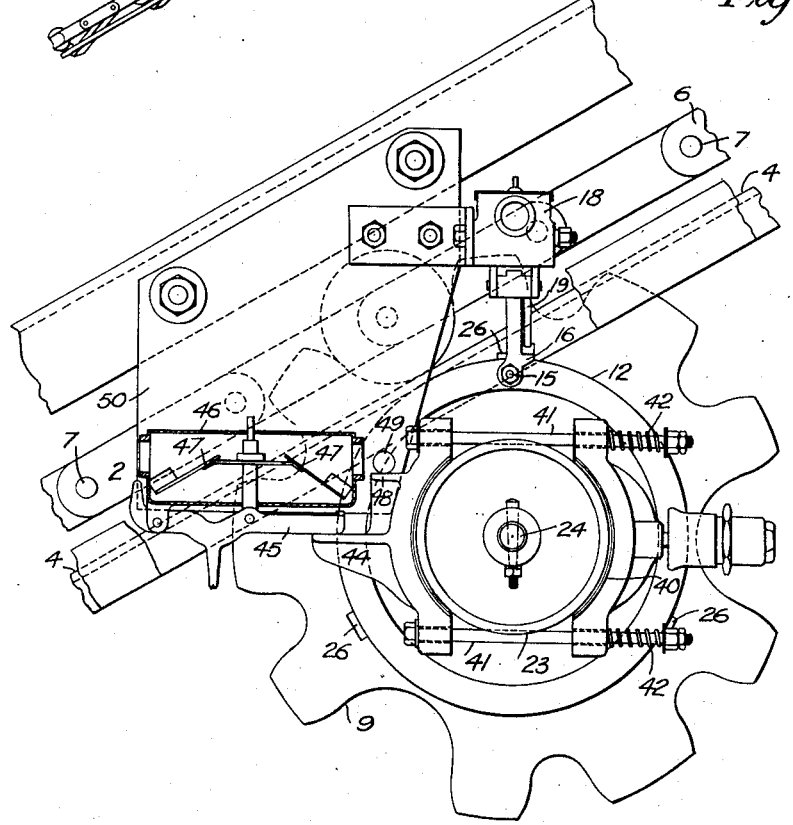
Frederick William Blackburne INVENTOR
BY Walter E. F. Bradley   ATTORNEY

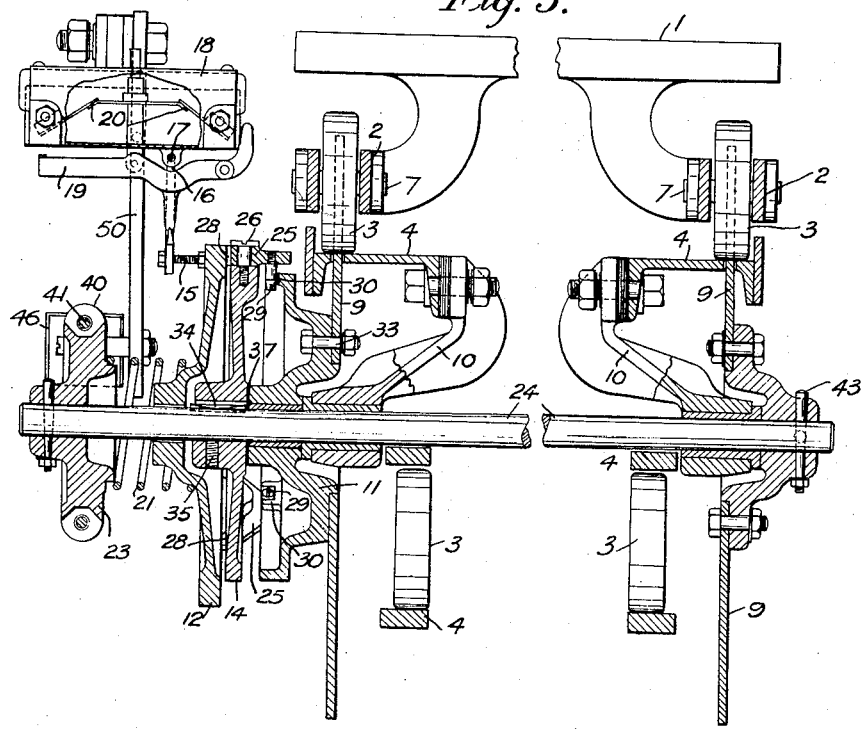

Patented Dec. 11, 1928.

1,695,083

UNITED STATES PATENT OFFICE.

FREDERICK WILLIAM BLACKBURNE, OF LONDON, ENGLAND, ASSIGNOR TO OTIS ELEVATOR COMPANY, OF NEW YORK, N. Y., A CORPORATION OF NEW JERSEY.

ESCALATOR SAFETY DEVICE.

Application filed November 30, 1926, Serial No. 151,701, and in Great Britain September 25, 1926.

This invention relates to escalators, inclined conveyors and the like, comprising a series of load-supporting members, driving chains arranged in parallel relation for operating said load-supporting members, and motive means for actuating said driving chains.

The object of the invention is to provide an emergency safety device for interrupting the drive in the event for example of the breakage of one of the driving chains. Another object is to provide a safety device which shall be sufficiently sensitive to come into operation upon unequal stretching of the chains or upon excessive wear of one or more of the link pins, before any actual breakage occurs. A further object is to provide an improved safety device having driven members engaging the respective driving chains, in which the operation of the safety device does not necessitate any lateral displacement of said members, their engagement with the driving chains being therefore unaffected by the operation of the safety device. Other objects of the invention will appear from the subsequent description of an installation embodying the improved safety device.

I attain these objects by the mechanism illustrated in the accompanying drawings, in which:—

Figure 1 is a side elevation showing the upper portion of an electrically operated escalator fitted with the improved safety device.

Figure 2 is an enlarged view of the safety device as seen in Figure 1.

Figure 3 is a sectional elevation on line 3—3 of Figure 2, showing the assembly of the improved safety device upon the shaft carrying the members driven by the escalator chains.

Figure 4 is a detail on a larger scale.

Figure 5 is a similar view showing the position after the safety device has come into operation.

Referring to Figures 1 to 3, the escalator A to which the invention is applied, is shown as of the conventional type, having load-supporting steps or tread sections 1 designed to constitute a movable tread platform or surface adapted to be inclined and to connect two different floor levels (not shown). The steps or treads 1 are attached at the opposite sides of their front ends to two endless driving chains 2, running parallel to one another at the sides of the escalator, and carrying wheels 3 upon which the steps and chains travel. These wheels run on track rails 4, suitably arranged to constitute the horizontal and the inclined runs of the escalator.

The two endless chains 2 are mounted in line with two sprocket wheels 5, only one chain and sprocket being seen in Figures 1 and 2. The chains comprise links 6, pivotally connected to the front axles 7 of the steps 1, the teeth of the sprockets being shaped so as to mesh with these links and to receive the wheels 3 at regular intervals apart. The sprockets 5 are driven by any suitable power, for example an electric motor 8, as illustrated in Figure 1.

The improved safety device, shown more clearly in Figures 2 and 3, comprises two thin idling sprocket wheels 9, toothed to fit the escalator chains 2 each idling sprocket 9 is driven by the respective chain 2, and since in the normal operation of the escalator, the two chains travel at exactly the same speed, the two idling sprockets 9 will likewise rotate at the same speed. If however any difference in speed of the two chains occurs, the two idling sprockets will be rotated at different speeds or will undergo relative displacement in the angular direction of rotation.

The two idling sprockets 9 are mounted upon a common shaft 24 which is supported by suitable bearing brackets 10 from the track rails 4. One sprocket, viz that on the right side of Figure 3, is rigidly secured to the shaft 24, as by a taper pin 43, while the other sprocket is secured, as by bolts 33, to the dished web of a disc 11 rotatable upon the shaft 24. A second disc 14 is rigidly secured upon the shaft, as by a key 34 and grub-screw 35, so as to rotate therewith. The two discs 11, 14 are therefore driven in fixed relation with the respective sprocket wheels 9 and driving chains 2.

It will be noted that the shaft 24 is located or held endwise by the engagement of the outer faces of the bearings 10 with the central bosses of the fixed sprocket 9 and of the disc 11 respectively, the disc 11 in turn abutting against the disc 14 which is fixed to the shaft. In assembling the parts upon the shaft, a suitable packing washer or shim 37 is inserted between the abutting faces of the discs 11, 14, so as to allow adjustment of the clearance in order to prevent endwise movement without causing the parts to bind. By this means, the shaft 24 is held against longitudinal movement, and lateral displacement of the discs 11, 14 and sprocket 9 is prevented, so that the sprockets remain always in line with their respective driving chains.

Upon the shaft 24 there is also mounted a third disc 12, which as shown is of larger diameter than the discs 11, 14; this disc 12 is freely mounted around the shaft, but is engaged by a coiled compression spring 21 which tends to move it towards the disc 14, the other end of this spring bearing against a fixed abutment provided for example by a drum 23 secured upon the shaft. The periphery of the disc 12 is adapted to engage upon one side with an adjustable screw 15, which is carried by an arm 16 hinged at 17; the arm 16 controls the trigger 19 of an electrical switch 18, so that the tripping of this trigger opens the switch contacts 20.

The contacts 20 in opening are adapted to break the circuit to a winding 38 of a motor switch B shown in Figure 1; the switch B in becoming deenergized will by its then open contacts 36 interrupt the circuit to the escalator driving motor 8, thereby stopping the motor and the escalator.

The lateral movement of the disc 12 necessary to produce its engagement with the screw 15 for stopping the escalator is obtained without any lateral displacement of the two discs 11, 14, and therefore without any lateral displacement of the idling sprockets 9, by the following device: The periphery of the disc 12 upon its side face remote from the screw 15, engages with the extremities of the opposite arms 28 of a rocking lever 25 (see Figure 4); this lever is pivotally mounted upon a fulcrum pin 26 secured radially in the periphery of the disc 14. Upon the side remote from the disc 12, the lever 25 comprises a web 27 connecting the two arms 28; a pin 29, screwed into this web in a direction radial of the disc 12, provides a comparatively short crank arm whereby the lever 25 may be rocked upon its fulcrum so as to bring one or other of the longer arms 28 into operation to displace the disc 12 laterally, forcing it along the shaft 24 against the action of the spring 21.

The crank pin 29 engages in an open-sided notch or recess 30 formed at the periphery of the disc 11. So long as the two discs 11, 14 are in their normal relative position, the crank pin 29 rests in this notch 30, with the lever arms 28 in even pressure against the disc 12, as illustrated in Figure 4, so as to resist the axial thrust of the spring 21.

Upon breakage of one of the escalator chains, however, the relative rotation of the discs 11, 14, produced by the differential movement of the two sprocket wheels 9, causes the notch 30 in the disc 11 to operate the crank pin 29 so as to rock the lever 25 about its fulcrum, thereby forcing one or other of the lever arms 28 to displace the disc 12 laterally away from the other two discs, as illustrated in Figure 5; the displacement of the disc 12 effects the opening of the switch B in the supply circuit to the motor, as already explained.

It will be noted from Figure 5 that a comparatively small relative rotation of the discs 11, 14 produces a considerable lateral displacement of the disc 12; the improved safety device can therefore be arranged to operate with great sensitiveness, without requiring such delicate adjustment as to make it liable to come into action without due cause. On the other hand, the sensitiveness is such that unequal stretching of the two chains, due for example to excessive wear of one or more of the link pins, will be indicated by the operation of the safety device before any actual breakage occurs.

It will also be seen from Figure 5 that the lever 25 is maintained in its fully rocked position by the engagement of the crank pin 29 with the side face of the disc 11 until the normal position of the two discs 11, 14 is restored. There is substantially no lateral displacement or separation of the driven discs 11, 14, so as not to affect the meshing of the sprocket wheels 9 with the escalator chains, whereas the lateral displacement of the third disc 12 can be multiplied to any desired extent by the effect of the lever 25.

As shown in Figure 3, the disc 11 may be provided with more than one notch 30, there being preferably three rocking levers 25 spaced apart at suitable distances around the periphery of the disc 14.

The present invention may be utilized in combination with a non-reversing safety device for interrupting the power supply upon accidental reversal of the escalator, the drum 23 mentioned above being grooved to receive a pair of rubbing shoes 40, each having a V-section bearing surface, and the two shoes being held together in contact with the correspondingly grooved drum 23 by a pair of rods 41 tensioned by springs 42. One shoe 40 has an arm 44 formed thereon, which holds up the trigger 45 of an electrical switch 46; the trigger in turn holds a pair of switch contacts 47 in electrical connection, the switch 46 being arranged in series with the switch 18 of the safety device, so that if either switch is opened, the escalator motor will be stopped in the manner already described.

The shoe provided with the arm 44 has also a projection 48, adapted to abut against a bolt 49 held by a vertical plate 50 fastened to the escalator frame-work and supporting the two switches 18, 46. The abutment of the projection 48 against this bolt 49 holds the shoes 40 from turning with the drum 23 in the normal direction of running. Should the escalator be caused to reverse to the opposite direction of travel, as by excessive load on an ascending escalator, the drum 23 will turn the shoes 40 in the backward direction, causing the projection 48 to leave the bolt 49 and the arm 44 to leave the trigger 45; the latter will therefore drop by its own weight and break the electrical connection between the contacts 47 of the switch 46, thereby stopping the driving motor 8 as already explained.

Having thus described my invention, what I claim is:—

1. An escalator safety device, comprising a pair of revoluble discs driven by the respective escalator chains, said discs being mounted coaxially, a third disc mounted beside said pair of discs, means for displacing said third disc laterally in the event of rotation of said pair of discs relatively to one another, said means including an unequal-armed lever fulcrumed upon one and engaged by its shorter arm with the other of said pair of discs and having its longer arm adapted to bear against a side face of said third disc, and means for interrupting the drive upon resulting lateral displacement of said third disc.

2. An escalator safety device, comprising revoluble discs driven by the respective escalator chains, said discs being mounted coaxially, interengaging means provided upon said discs, another disc mounted beside said first mentioned discs, said interengaging means adapted upon relative rotation of said first mentioned discs to produce lateral displacement of said other disc, and means for interrupting the drive upon such lateral displacement of said other disc.

3. An escalator safety device, comprising revoluble discs driven by the respective escalator chains, said discs being mounted coaxially, interengaging means provided upon said discs, said interengaging means including a multiplying lever with unequal arms, another disc mounted beside said first-mentioned discs, said interengaging means adapted upon relative rotation of said first mentioned discs to produce lateral displacement of said other disc, and means for interrupting the drive upon such lateral displacement of said other disc.

4. An escalator safety device, comprising a rotatable shaft, a pair of idling sprockets mounted upon said shaft, said sprockets meshing with the respective escalator driving chains, one of said sprockets being fast and the other loose upon said shaft, a pair of revoluble discs mounted upon said shaft, one of said discs being fast and the other loose upon said shaft, said loose sprocket and said loose disc being connected to rotate together, a third disc mounted around said shaft and arranged beside said pair of revoluble discs, interengaging means provided at the peripheries of said pair of revoluble discs, said interengaging means including an unequal-armed lever fulcrumed upon one and engaged by its shorter arm with the other of said pair of revoluble discs and having its longer arm adapted to bear against a side face of said third disc, and means for interrupting the drive upon the resulting lateral displacement of said third disc.

5. In an escalator safety device of the kind described, the combination of a pair of coaxial discs driven by the respective chains, means for preventing lateral displacement of said discs, a third disc mounted beside said pair of coaxial discs and capable of being displaced laterally in relation thereto, and a plurality of levers pivotally mounted upon one of said pair of discs, said levers having comparatively short arms in engagement with the other of said pair of discs and having comparatively long arms bearing against said third disc, the rotation of said pair of discs relatively to one another producing rocking movement of said levers to effect lateral displacement of said third disc and thereby to interrupt the drive.

6. In an escalator safety device of the kind described, the combination of a pair of coaxial discs driven by the respective chains, means for preventing lateral displacement of said discs, a third disc mounted beside said pair of coaxial discs and capable of being displaced laterally in relation thereto, and a plurality of levers pivotally mounted on radial axes upon one of said pair of discs, and lying tangentially to said one disc, said levers having comparatively short arms in engagement with the other of said pair of discs and having comparatively long arms adapted to bear against a side face of said third disc, the rotation of said pair of discs relatively to one another in the event of differential speed of the escalator chains producing rocking movement of said levers to effect lateral displacement of said third disc and thereby to interrupt the drive.

In testimony whereof I hereunto affix my signature.

FREDERICK WILLIAM BLACKBURNE.